United States Patent
Itami et al.

(10) Patent No.: US 7,813,020 B2
(45) Date of Patent: Oct. 12, 2010

(54) HYDRODYNAMIC BEARING UNIT, AND OPTICAL DEFLECTOR, OPTICAL SCANNER AND IMAGE FORMING APPARATUS USING THE SAME

(75) Inventors: Yukio Itami, Yokohama (JP); Kensuke Masuda, Kodaira (JP); Yoshihiro Takahashi, Miyagi (JP); Tomotaka Takamura, Miyagi (JP); Noriyuki Kadowaki, Miyagi (JP)

(73) Assignees: Ricoh Company, Ltd., Tokyo (JP); Tohoku Ricoh Co., Ltd., Shibata-gun (JP)

( * ) Notice: Subject to any disclaimer, the term of this patent is extended or adjusted under 35 U.S.C. 154(b) by 261 days.

(21) Appl. No.: 12/106,863

(22) Filed: Apr. 21, 2008

(65) Prior Publication Data
US 2008/0259424 A1 Oct. 23, 2008

(30) Foreign Application Priority Data
Apr. 19, 2007 (JP) ............................. 2007-110860

(51) Int. Cl.
G02B 26/08 (2006.01)

(52) U.S. Cl. .................................. 359/200.1
(58) Field of Classification Search ... 359/200.1–200.5, 359/216.1; 310/67 R, 90
See application file for complete search history.

(56) References Cited

U.S. PATENT DOCUMENTS

| | | | |
|---|---|---|---|
| 5,806,987 A * | 9/1998 | Nose et al. | 384/100 |
| 7,126,737 B2 | 10/2006 | Atsuumi et al. | |
| 2004/0184127 A1* | 9/2004 | Nakajima et al. | 359/204 |
| 2006/0061847 A1 | 3/2006 | Itami | |
| 2006/0208179 A1 | 9/2006 | Itami | |
| 2007/0146852 A1 | 6/2007 | Itami | |
| 2007/0153349 A1 | 7/2007 | Itami et al. | |

FOREIGN PATENT DOCUMENTS

| | | |
|---|---|---|
| JP | 5-22649 | 1/1993 |
| JP | 5-327969 | 12/1993 |
| JP | 6-3615 | 1/1994 |
| JP | 9-318900 | 12/1997 |
| JP | 10-31177 | 2/1998 |
| JP | 10-31181 | 2/1998 |
| JP | 10-31182 | 2/1998 |
| JP | 10-31183 | 2/1998 |

(Continued)

*Primary Examiner*—Euncha P Cherry
(74) *Attorney, Agent, or Firm*—Oblon, Spivak, McClelland, Maier & Neustadt, L.L.P.

(57) ABSTRACT

A hydrodynamic bearing unit using oil includes a shaft to be driven, a bearing member configured to support the shaft in a non-contact manner through a bearing gap by a hydrodynamic pressure of the oil, which is generated in the bearing gap while the shaft relatively rotate with respect to the bearing member, a housing configured to house the bearing member and having an opening at one end thereof, another end thereof being enclosed, a sealing member configured to seal a part of the opening of the housing, a channel configured to communicate a space formed between the shaft, the bearing member and the housing with an outside air, and a pressing member configured to press and fix the bearing member on the housing. At least one open part configured to release an air bubble contained in the housing is provided between the bearing member and the sealing member.

17 Claims, 11 Drawing Sheets

FOREIGN PATENT DOCUMENTS

| | | |
|---|---|---|
| JP | 2957785 | 7/1999 |
| JP | 11-305161 | 11/1999 |
| JP | 2000-275563 | 10/2000 |
| JP | 2002-27706 | 1/2002 |
| JP | 2002-139041 | 5/2002 |
| JP | 2002-303815 | 10/2002 |
| JP | 2002-372680 | 12/2002 |
| JP | 3391954 | 1/2003 |
| JP | 2003-153516 | 5/2003 |
| JP | 2003-177346 | 6/2003 |
| JP | 2004-333657 | 11/2004 |
| JP | 2005-92129 | 4/2005 |
| JP | 2005-107512 | 4/2005 |
| JP | 2005-352059 | 12/2005 |
| JP | 2006-72038 | 3/2006 |
| JP | 2006-113213 | 4/2006 |
| JP | 2006-259336 | 9/2006 |
| JP | 2007-6697 | 1/2007 |
| JP | 2007-133192 | 5/2007 |
| JP | 2007-171503 | 7/2007 |
| JP | 2007-171841 | 7/2007 |
| JP | 2007-178465 | 7/2007 |
| JP | 3995961 | 8/2007 |
| JP | 2007-316657 | 12/2007 |
| JP | 2008-70752 | 3/2008 |
| JP | 2008-170791 | 7/2008 |
| JP | 2009-66834 | 4/2009 |
| JP | 2009-69474 | 4/2009 |

* cited by examiner

HYDRODYNAMIC BEARING UNIT, AND OPTICAL DEFLECTOR, OPTICAL SCANNER AND IMAGE FORMING APPARATUS USING THE SAME

CROSS REFERENCE TO RELATED APPLICATIONS

The present application is based on and claims priority from Japanese Application Number 2007-110860, filed on Apr. 19, 2007, the disclosure of which is hereby incorporated by reference herein in its entirety.

BACKGROUND OF THE INVENTION

1. Field of the Invention

The present invention relates to a hydrodynamic bearing unit, an optical deflector, an optical scanner, and an image forming apparatus in which easy assembling is provided, oil-leakage is prevented, and high accuracy is achieved.

2. Description of the Related Art

A conventional optical deflector used in an optical scanner has, as disclosed in Japanese Patent Application Publication No. 2002-139041, a structure in which a bearing member has an end portion, which is disposed adjacent to an opening of a housing and in which an annular oil accumulation portion is provided, and another end which is fixed on the housing with an adhesive.

On the other hand, Japanese Patent Application Publication No. 2005-92129 discloses an optical deflector of an optical scanner in which mirrors are downsized and rotated at high rotational speed, that is, about 50,000 to 60,000 rpm. Due to structures disclosed in Japanese Patent Application Publication No. 2005-92129, mirrors are downsized and a bearing dimension is reduced in size and diameter so that bearing loss is reduced. Thereby, high rotational speed over 60,000 rpm can be achieved. However, it is difficult to fix the bearing on the housing with adhesives, and therefore assembly is remarkably degraded.

To solve the above problems, as disclosed in Japanese Patent Application Publication No. 2002-139041, it is proposed that the bearing member is disposed in a close contact state with the sealing member to fix the bearing member onto the housing. However, in this case, there is a possibility of oil-leakage occurring.

SUMMARY OF THE INVENTION

An object of the present invention is to provide a hydrodynamic bearing unit, an optical deflector, an optical scanner, and an image forming apparatus, in which high rotational speed is achieved due to downsizing of the bearing unit and reducing the diameter of the bearing unit, easy assembling is provided, oil-leakage is prevented, and high accuracy is achieved.

To achieve the above object, the hydrodynamic bearing unit according to an embodiment of the present invention uses oil and includes a bearing member configured to support the shaft in a non-contact manner through a bearing gap by a hydrodynamic pressure of the oil, which is generated in the bearing gap while the shaft relatively rotates with respect to the bearing member, a housing configured to house the bearing member and having an opening at one end thereof, another end thereof being enclosed, a sealing member configured to seal at least a part of the opening of the housing, a channel configured to communicate a space formed between the shaft, the bearing member and the housing with outside air, and a pressing member configured to press and fix the bearing member on the housing. At least one open part configured to release air bubbles contained in the housing is provided between the bearing member and the sealing member.

DETAILED DESCRIPTION OF THE PREFERRED EMBODIMENTS

Figure 1:
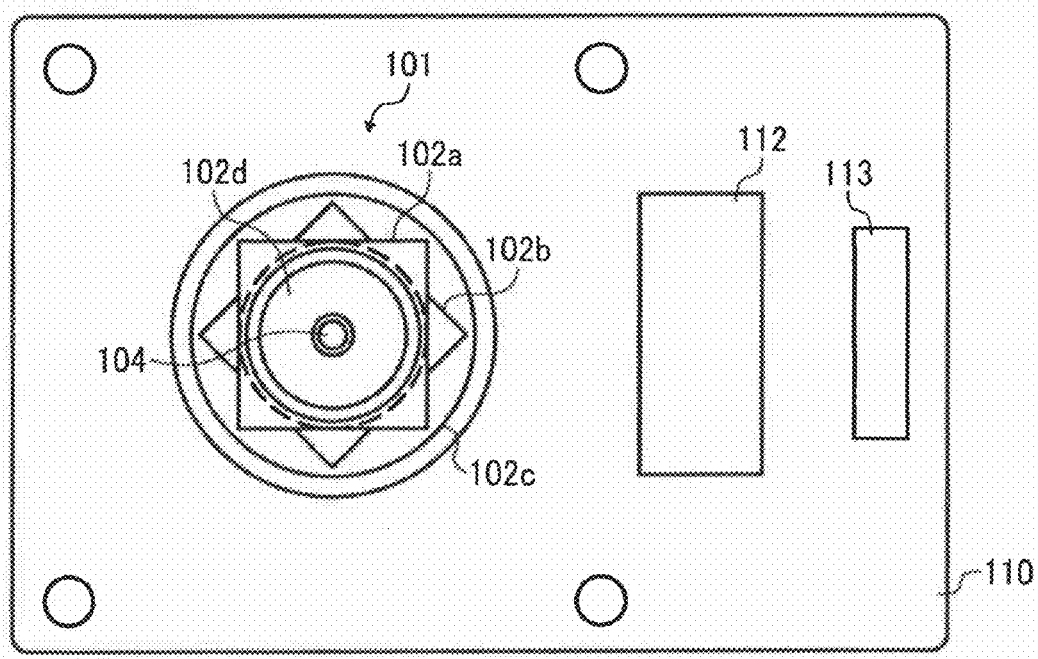
FIG. 1 is a sectional view illustrating an optical deflector according to an embodiment of the present invention.

Preferred embodiments of the present invention will be described in detail with reference to the accompanying drawings below.

A hydrodynamic bearing unit according to an embodiment of the present invention will be described with reference to FIG. 4. A hydrodynamic bearing unit U using oil includes a shaft 104 to be driven, a bearing member 105 configured to support the shaft 104 in a non-contact manner through a bearing gap (not shown) by a hydrodynamic pressure of the oil, which is generated in the bearing gap while the shaft 104 relatively rotates with respect to the bearing member 105, a housing 106 configured to house the bearing member 105 and having an opening at one end thereof, another end thereof being enclosed, a sealing member 109 configured to seal at least a part of the opening of the housing 106, a channel 115 configured to communicate a space formed between the shaft 104, the bearing member 105 and the housing 106 with outside air, and a pressing member (described later) configured to press and fix the bearing member 105 on the housing 106. In the hydrodynamic bearing unit U according to an embodiment of the present invention, at least one open part configured to release air bubbles contained in the housing 106 is provided between the bearing member 105 and the sealing member 109.

Figure 3:
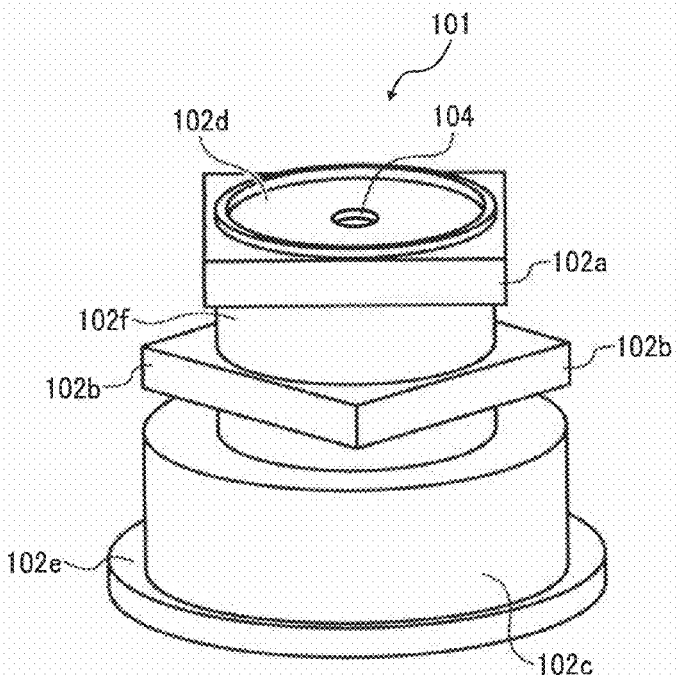
FIG. 3 is a perspective view illustrating a rotary body of an optical deflector according to an embodiment of the present invention.

The hydrodynamic bearing unit U according to an embodiment of the present invention may be used in an optical deflector 101 including at least one polygon mirror 102a (102b), which is fixed on the shaft 104 of the hydrodynamic bearing unit U as shown in, for example, FIG. 3. A plurality of the polygon mirrors 102a, 102b may be disposed in a multi-stage manner in an axial direction of the shaft 104 and may be fixed such that a deflection surface of the one polygon mirror 102a is shifted by a predetermined angle from that of the other polygon mirror 102b in a rotational direction of the plurality of the polygon mirrors 102a, 102b.

First Embodiment

<Optical Deflector>

Figure 2:
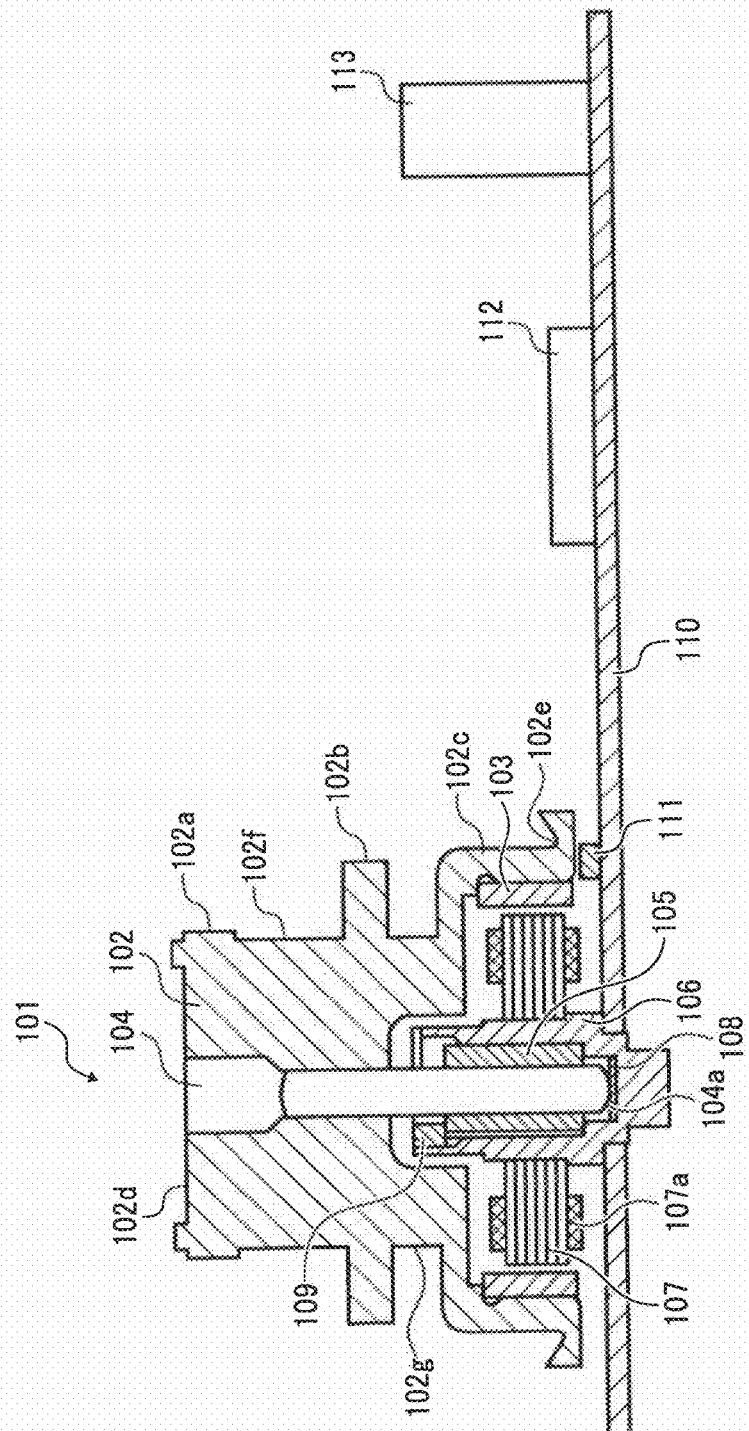
FIG. 2 is a sectional view illustrating an optical deflector according to an embodiment of the present invention.

The optical deflector using the hydrodynamic bearing unit according to a first embodiment of the present invention will be explained with reference to FIGS. 1 to 3. FIG. 1 is a plan view of a rotary body 101 as the optical deflector, FIG. 2 is a cross-sectional view of the rotary body 101, and FIG. 3 is a perspective view of the rotary body 101.

The rotary body 101 is constituted of the upper polygon mirror 102a, the lower polygon mirror 102b, and a flange 102c supporting a rotor magnet 103. The rotary body 101 is shrink-fitted to an outer circumference of the shaft 104. The bearing member 105 is an oil-impregnated member which is used as a dynamic pressure bearing, and the gap between the bearing member 105 and the shaft is set to 10 μm or less in a diametrical direction. In order to secure a stable high-speed rotation of the rotary body 101, the bearing member 105 is provided with not-shown grooves generating a dynamic pressure. Generally, the grooves are provided on the outer circumference of the shaft 104 or on an inner circumference of the bearing member 105; however, the grooves are preferably provided on the inner circumference of the bearing member 105, which is made of a sintered member with good workability.

A material of the shaft 104 is preferably a quenchable martensite stainless steel (for example, SUS420J2) because of its high surface hardness and anti-friction performance.

The rotor magnet 103 is fixed on an inner surface of a lower part of the flange 102c, and constitutes a brushless motor of an outer rotor type together with a stator core 107 (winding coil 107a) fixed on the housing 106. The rotor magnet 103 is a bond magnet using a resin as a binder and is supported at an outer circumferential portion thereof by the flange 102c for the purpose of preventing destruction during the high-speed rotation due to centrifugal force.

A thrust member 108 is used for a bearing member in the axial (thrust) direction of the shaft 104 and faces a convex curve surface 104a formed on a bottom end surface of the shaft 104 to serve as a pivot bearing. The thrust member 108 is preferably made of a martensite stainless steel, ceramics, a metal member having a surface which is hardened through the DLC (Diamond like Carbon) process or the like, or a resin material, etc., and has a good lubricating property. Because of the lubricating property, it is possible to suppress generation of powder particles due to wear. The bearing member 105 and the thrust member 108 are contained in the housing 106, and oil-leakage therefrom is prevented by the sealing member 109.

For rotating the rotary body 101 at a high speed of 25,000 rpm or more, it is necessary to adjust and maintain the balance of the rotary body 101 accurately so as to reduce the vibration thereof. The rotary body 101 has two, upper and lower balance adjusting portions. The upper balance adjusting portion is a concave portion 102d formed on an upper surface of the rotary body 101 and the lower balance adjusting portion is a concave portion 102e formed on a peripheral area of the flange 102c. The concave portions 102d, 102e are coated with respective adhesives for balance adjustment. The amount of unbalance is required to be 10 mg·mm or less, and therefore, a difference in mass among portions on a radius of 10 mm is maintained at 1 mg or less.

In a case where the balance adjustment through the coating of adhesives is difficult to achieve or the adhesives are exfoliated or dispersed at the rotation speed of 40,000 rpm or more since the amount thereof is too little and their adhesivities are weak, it is preferable to remove a part of a component of the rotary body 101 by drilling, cutting or laser processing instead of performing such a minute adjustment.

The optical deflector according to the present embodiment employs a motor system of an outer rotor type in which a magnetic gap is provided in a radial direction and the rotor magnet 103 is laid out on the outer circumference of the stator core 107. The rotary body 101 is rotated by excitation switching of the winding coil 107a through a driver IC 112, referring to signals as position signals, which are outputted from Hall elements 111 mounted on a circuit board 110 according to a magnetic field of the rotor magnet 103. The rotor magnet 103 is radially magnetized and generates rotation torque in relation to the outer circumference of the stator core 107 so that the rotary body 101 is rotated.

Magnetic paths of the rotor magnet 103 are open in radial and vertical directions and the Hall elements 111 for excitation switching of the motor unit are disposed on the open magnetic paths. A not-shown harness is connected to a connector 113 so that via the connector 113, power is supplied from the exterior, the driving of the motor is stopped, or control signals corresponding to, for example, the rotation speed or the like are outputted/inputted.

The upper and lower polygon mirrors 102a, 102b are connected to each other through a connecting portion 102f. The respective deflection surfaces of the upper and lower polygon mirrors 102a, 102b are fixed with a shift angle of 45 degrees as a phase difference in the rotation direction. Also, a connecting portion 102g is provided between the lower polygon mirror 102b and the flange 102c. In other words, the upper and lower polygon mirrors 102a, 102b are connected with the flange 102c as a part of the motor unit and integrated with the motor unit. In order to suppress windage loss to reduce noise and rotational energy as well as to reduce materials used to form the rotary body to reduce the effects on the environment, the polygon mirror is downsized so that the polygon mirror is smaller than the motor unit.

The above optical deflector may be used in an optical scanner at a high rotational speed of 20,000 rpm to 60,000 rpm or more. In order to rotate the polygon mirror at more than 60,000 rpm, since bearing loss is needed to be small, a small hydrodynamic bearing, in which a diameter of the shaft 104 is about φ2 mm, is used.

<Hydrodynamic Bearing Unit>

The hydrodynamic bearing unit is explained with reference to FIGS. 4 to 7. FIG. 4 is a sectional view of the hydrodynamic bearing unit according to an embodiment of the present invention, which is used in the optical deflector, FIG. 5 is a perspective view of the hydrodynamic bearing unit, FIGS. 6A and 6B are enlarged views of the bearing member, and FIG. 7 is an enlarged view of the sealing member.

Figure 4:
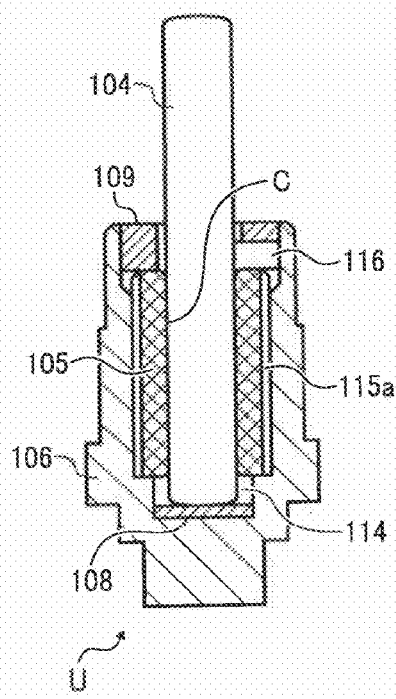
FIG. 4 is a sectional view illustrating a hydrodynamic bearing unit of an optical deflector according to an embodiment of the present invention.
Figure 5:
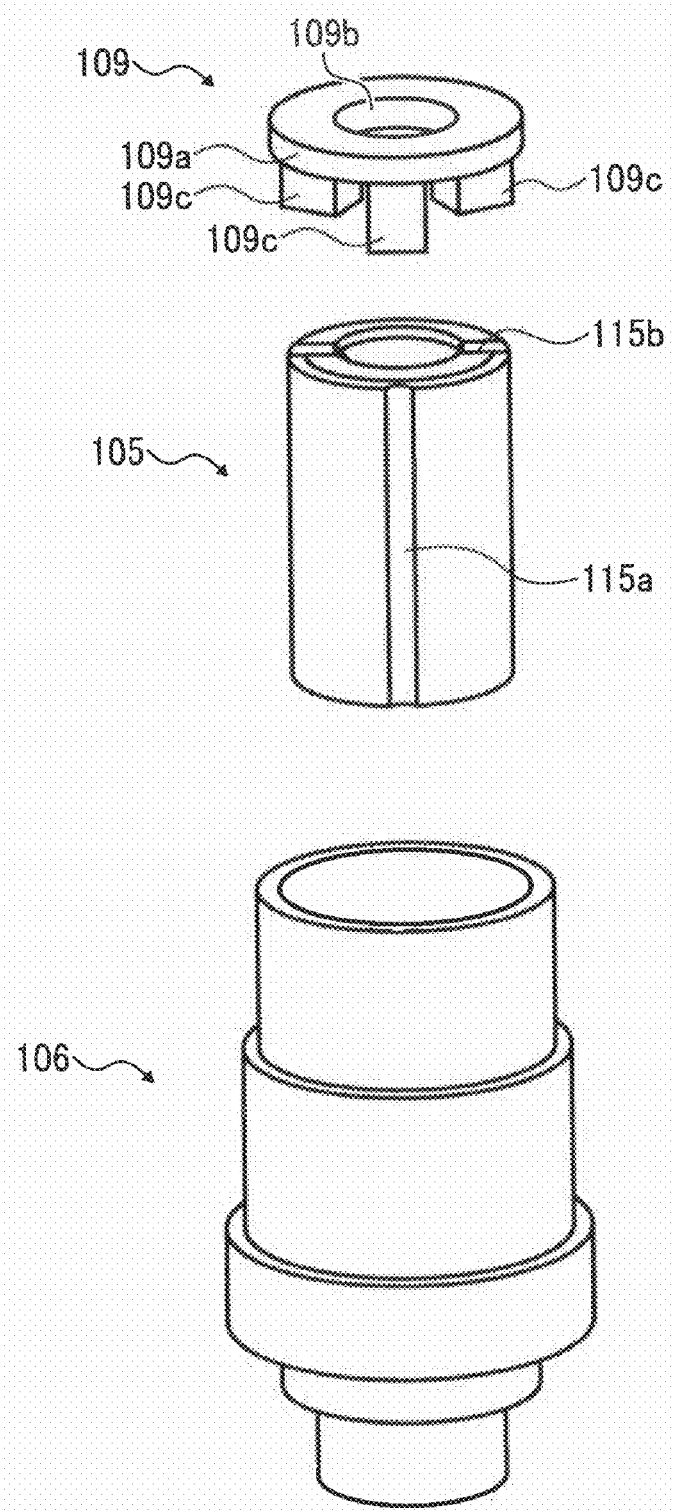
FIG. 5 is a perspective view illustrating a hydrodynamic bearing unit according to an embodiment of the present invention.

As shown in FIGS. 4 and 5, the hydrodynamic bearing unit U includes the shaft 104, the bearing member 105, the housing 106, the thrust member 108, and the sealing member 109. The sealing member 109 serves also as a pressing member pressing the bearing member 105 onto the housing 106.

Bushing surfaces 105d facing the outer circumferential surface of the shaft 104 via a small bearing gap C are provided on two parts of the inner circumference of the bearing member 105 with an interval in the axial direction of the shaft 104. A plurality of dynamic pressure grooves 105e (Herringbone-type) inclining in relation to the axial direction of the shaft 104 are formed in a peripheral direction on both of the two bushing surfaces 105d. The dynamic pressure grooves 105e are only required to be inclined, but the grooves 105e are not limited to Herringbone-type grooves as long as the grooves are inclined, that is, the grooves may be in a spiral form. A depth of the dynamic pressure groove 105e is preferably about 2 to 10 µm, for example, 3 µm.

Figure 6A:
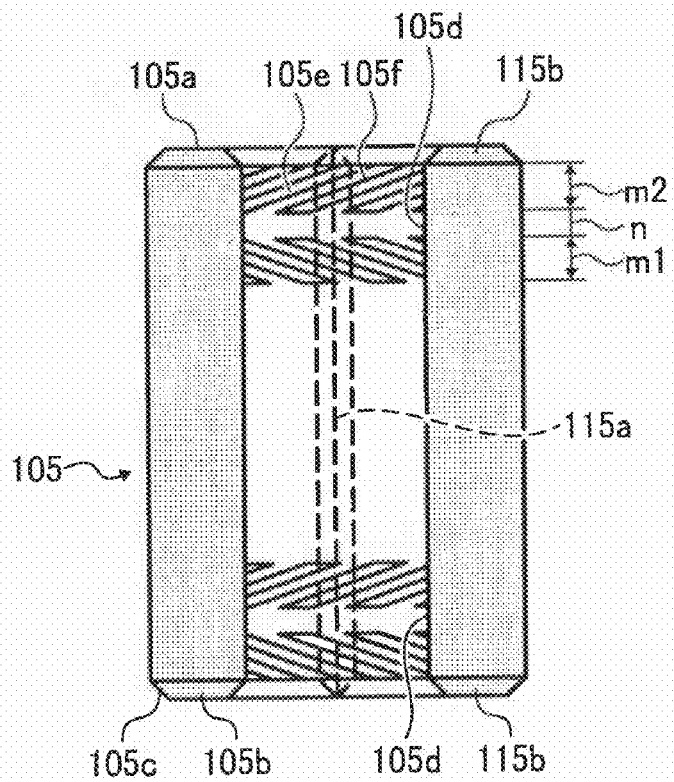
FIG. 6A is an enlarged view illustrating a bearing member of a hydrodynamic bearing unit according to an embodiment of the present invention.
Figure 6B:
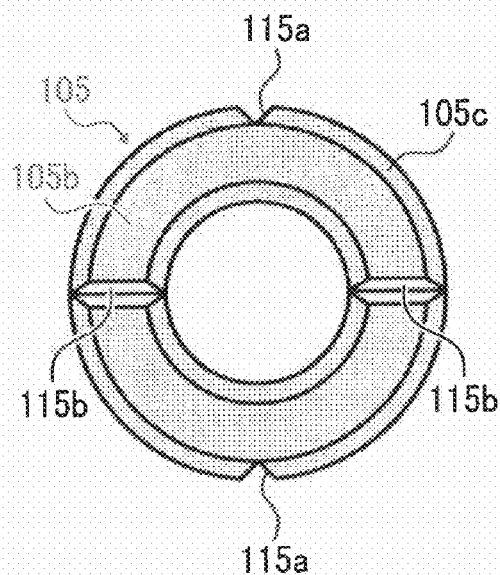
FIG. 6B is an enlarged view illustrating a bearing member of a hydrodynamic bearing unit according to an embodiment of the present invention.
Figure 7:
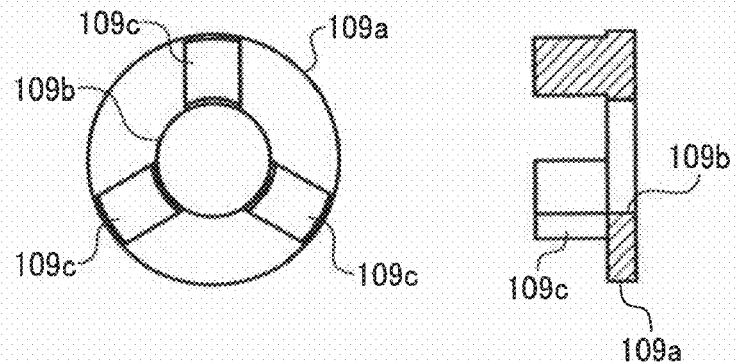
FIG. 7 is an enlarged view illustrating a sealing member of a hydrodynamic bearing unit according to an embodiment of the present invention.

As shown in FIG. 6A, each of the bushing surfaces 105d includes a first groove area m1 in which the dynamic pressure grooves 105e are inclined in one direction, a second groove area m2 in which the dynamic pressure grooves 105e are inclined in another direction with a distance in the axial direction of the shaft 104, and a flat area n disposed between the two groove areas m1, m2 in a circular form. The dynamic pressure grooves 105e are discontinuously defined at the flat area n. Background portions 105f defined by the dynamic pressure grooves 105e are in the same level as the flat area n. Here, the background portions 105f have the same height in the axial direction of the shaft 104 as the flat area n.

In the hydrodynamic bearing unit, the oil such as lube oil, base oil of lubricating grease or the like, which is impregnated in the bearing member 105, is exuded from the surface of the bearing member 105 due to pressure (negative pressure) generated by the rotation of the shaft 104 and thermally-expanded oil due to rising temperature. The extruded oil is sucked into the bearing gap C between the bushing surface 105d and the outer circumferential surface of the shaft 104 through the dynamic pressure grooves 105e. The oil sucked into the bearing gap C forms a lubricating oil membrane on the bushing surface 105d to support the shaft 104 in a non-contact manner. When positive pressure is generated on the bushing surface 105d, since there are pores, which are fine pores in a porous body of the bearing member 105 and are open on an outer surface of the porous body, on the surface of the bushing surface 105d, the oil refluxes into the bearing member 105. Since the oil continuously flows into the bushing surface 105d, high membrane force and rigidity of the oil are maintained. In this case, since the stable oil membrane is continuously formed, high rotation accuracy can be achieved so that axial runout, NRRO, jitter, and the like can be reduced. In addition, since the shaft 104 and the bearing member 105 are relatively rotated in a non-contact manner, low noise and low cost can be achieved.

When the hydrodynamic bearing unit U is assembled, the shaft 104 is inserted in the inner peripheral portion of the bearing member 105 in a state where the bearing member 105 is mounted on the housing 106. Before the shaft 104 is inserted, oil is added in the housing to improve the lubricating ability. However, since the bearing gap C between the bearing member 105 and the shaft 104 is of only several µm, air trapped in the housing 106, that is, in a space between the end of the shaft 104 and an upper surface of the added oil is not released so that it is difficult to insert the shaft 104 into the bearing unit U.

As a solution to the above problem, as shown in FIGS. 4 to 6B, the hydrodynamic bearing unit U is provided with the channel 115 (115a, 115b), which is configured to communicate an enclosed space 114 formed in the enclosed end of the housing 106 and surrounded by the shaft 104, the bearing member 105, and the housing 106 with outside air. The channel 115 includes a first channel 115a connecting both end surfaces 105a, 105b of the bearing member 105 and a second channel 115b communicating the enclosed space 114 with the first channel 115a. The first channel 115a is formed between the outer circumferential surface of the bearing member 105 and the inner circumferential surface of the housing 106, and the second channel 115b is formed between the bottom end surface of the bearing, facing the enclosed surface of the housing 106 and the housing 106. In this embodiment, as shown in FIGS. 6A and 6B, the two grooves are formed as the first channels 115a on the outer circumferential surface of the bearing member 105 in the axial direction of the shaft 104, and the two grooves are formed as the second channels 115b on the bottom end surface 105b of the bearing member 105 in the radial direction of the shaft 104. However, the present invention is not limited thereto. For example, the first channel 115a may be formed on the inner circumferential surface of the housing 106 and the second channel 115b may be formed on the housing 106.

As shown in FIG. 6B, although the first channel 115a and the second channel 115b have a phase shifting of 90 degrees, both channels 115a, 115b communicate with each other via a chamfer 105c formed on an outer peripheral area of the bottom end surface 105b of the bearing member 105.

In addition, the second channels 115b may be formed on both end surfaces 105a, 105b. In this case, even when the rotational direction of the bearing member 105 is determined depending on a pattern of the dynamic pressure grooves 105e formed on the outer circumferential surface of the bearing member 105, or the like, it is possible for the bearing member 105 to be used in both rotational directions by switching an inserting direction of the bearing member 105 into the housing 106 when assembling the bearing member 105 with the housing 106, as needed.

As shown in FIGS. 4 to 7, the opening of the housing 106 is sealed with the ring-shaped sealing member 109. The sealing member 109 as a pressing member may have at least one contact portion 109c which is in contact with the bearing member 105 in a circumferential direction of the bearing unit U and the at least one open part includes at least one space formed adjacent to the at least one contact portion 109c of the pressing member 109. The pressing member 109 may also have a plurality of contact portions 109c formed in circumferential directions and the sealing member 109 may be formed integrally in the pressing member. The sealing member 109 may be formed, for example, of a resin material such as polyamide, a metal material such as sintered metal, and an outer peripheral 109a of the sealing member 109 is press-fitted into the opening of the housing 106 to be fixed. The sealing member 109 also serves as the pressing member and three contact portions 109c pressing the end surface 105a of the bearing member 105 are integrally formed on three portions arranged in the circumferential direction of the shaft 104. The sealing member 109 is press-fitted in the opening of the housing 106 and the bearing member 105 is pressed by the contact portions 109c and fixed on the housing 106.

The sealing member 109 is disposed in a non-contact manner, that is, a small sealing gap is formed between the inner circumferential surface of the sealing member 109 and the outer circumferential surface of the shaft 104 to prevent oil-leakage from the housing 106 due to capillary vessel behavior in the sealing gap. At this time, if an oil-repellent agent is applied to at least an area of the outer circumferential surface of the shaft 104, which faces an inner circumferential surface 109b of the sealing member 109, oil-leakage can be effectively prevented. In order to prevent an increase of torque or torque fluctuations, the sealing member 109 may be preferably a non-contact seal.

At least one open part 116 is formed as a space between the bearing member 105 and the sealing member 109 and in which the contact portion 109c as the pressing member is not placed. Here, three open parts 116 each adjacent to the three contact portions 109c are formed in the circumferential direction between the bearing member 105 and the sealing member 109. In order to provide a sufficient area where air bubbles are to be destroyed, a cross-sectional surface area of the open parts 116 is set to be larger than a cross-sectional surface area of the shaft 104 as viewed in section perpendicular to the rotational axis of the shaft 104. Preferably, the cross-sectional surface area of the open parts 116 is set to be more than twice the cross-sectional surface area of the shaft 104 to facilitate breakage of the air bubbles in the open parts 116 so that oil-leakage can be efficiently prevented. That is to say, the following equation (1) is preferably satisfied, $$\pi D^2/4 \leq S1 \qquad (1)$$

where S1 is the cross-sectional surface area of the open parts 116 as viewed in section, which is perpendicular to the axis of the shaft 104, D is a diameter of the shaft 104, and $\pi$ is a circular constant.

For example, in a case where the diameter of the shaft 104 is 2 mm, S1 is preferably set to more than 3.14 mm$^2$, more preferably, more than 6.28 mm$^2$.

While the bearing unit U is driven, the oil exuded from the bearing member 105 passes through the channel 115 and is pressed toward the opening of the housing 106 to be accumulated in the open parts 116. At this time, if the sealing member 109 is fixed in a close-contact state on the top end surface of the bearing member 105 as described in Japanese Patent Application Publication No. 2002-139041, open parts which are sufficiently adapted to release the air bubbles entrapped in the bearing unit when the bearing unit is assembled are not obtained. Thereby, particularly when the bearing unit is driven over about 40,000 to 50,000 rpm and therefore the motor unit is heated, the entrapped air bubbles are expanded and the oil is pressed up so that the oil leaks outside through the sealing member 109.

On the other hand, since the open parts 116 are formed on three portions between the bearing member 105 and the sealing member 109, the entrapped air bubbles are destroyed in the open parts 116 and only the air is exhausted through the gap between the shaft 104 and the sealing member 109 so that oil-leakage can be prevented.

According to the embodiments of the present invention, the pressing member is integrally provided with the sealing member 109; however, the present invention is not limited thereto, that is to say, the pressing member can be separately provided.

As mentioned above, in the bearing unit according to the embodiment, the bearing member can be fixed on the housing without any adhesives, or the like. Therefore, there are advantageous effects in that the bearing unit is easily assembled and spaces sufficient to release the air entrapped in the bearing unit when the bearing unit is assembled are ensured so that the oil-leakage is effectively prevented to achieve reliability of the bearing unit.

In addition, in a case where the open parts are separately provided in the circumferential direction, the spaces sufficient to release the air entrapped in the bearing unit when the bearing unit is assembled can be obtained while pressing function to press the bearing member is ensured.

In a case where the plural contact portions are formed in the circumferential direction, pressing forces can be uniformly distributed on the bearing member when the bearing member is fixed on the housing.

In a case where the pressing member is integrally provided with the sealing member, the number of parts can be reduced and assembly operations can be simplified.

In a case where the sealing member is press-fitted, the sealing member can be strongly fixed so that cost for assembling can be reduced and the spaces and cross-sectional surface area sufficient to release the air entrapped in the bearing unit when the bearing unit is assembled can be ensured.

Second Embodiment

The bearing unit according to a second embodiment of the present invention will be explained below with reference to FIGS. 8 and 9.

Figure 8:
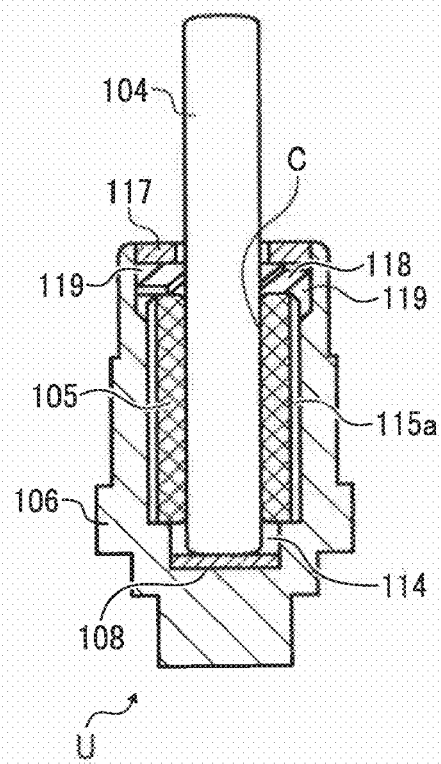
FIG. 8 is a sectional view illustrating a hydrodynamic bearing unit according to an embodiment of the present invention.
Figure 9:
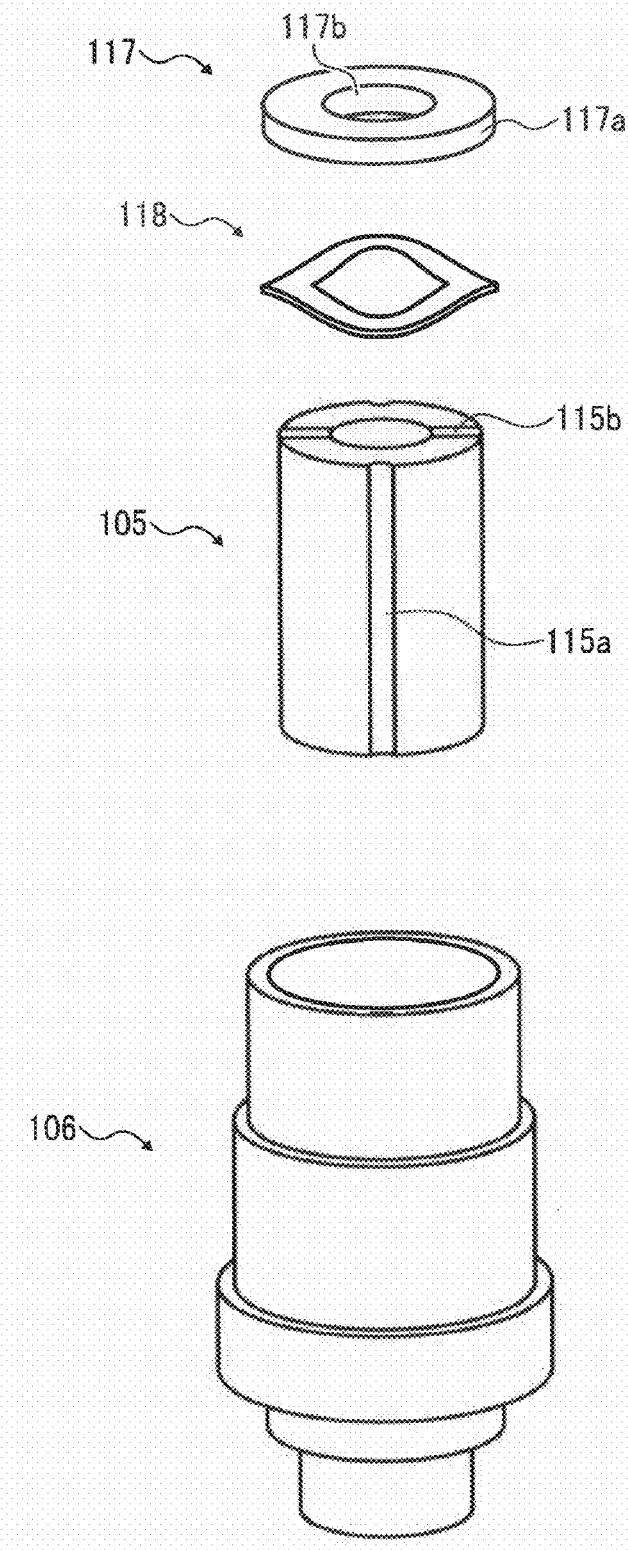
FIG. 9 is a perspective view illustrating a hydrodynamic bearing unit according to an embodiment of the present invention.

FIGS. 8 and 9 show configurations of the bearing unit according to this embodiment. As shown in FIGS. 8 and 9, the hydrodynamic bearing unit U includes the shaft 104, the bearing member 105, the housing 106, the thrust member 108, a sealing member 117, and a pressing member 118. The configurations of the bearing unit U according to this embodiment except for the sealing member 117 and the pressing member 118 are the same as those of the bearing unit according to the first embodiment and therefore the detailed explanation thereof will be omitted.

In the hydrodynamic bearing unit according to this embodiment, the pressing member 118 is an elastic member, such as a wave washer. The pressing member 118 may be fixed in a contact state with the bearing member 105 and the sealing member 117 by being pressed in the axial direction of the shaft 104. In this case, the open part is a space formed on a periphery of the pressing member 118.

The hydrodynamic bearing unit U is assembled as follows. The bearing member 105 and the wave washer as the pressing member 118 are inserted in the housing 106 through the opening of the housing 106. An outer circumferential surface 117a of the ring-shaped sealing member 117 is press-fitted in the opening of the housing 106 to be fixed. The sealing member 117 is made of, for example, resin material such as polyamide, metal material such as sintered metal. The sealing member 117 is press-fitted in the opening of the housing 106 and fixed so that the wave washer 118 is compressed in the rotational axis direction, and the wave washer 118 is fixed in an elastically deformed state to press and fix the bearing member 105 on the housing 106.

The sealing member 117 is a non-contact seal which is disposed so as to have fine sealing gaps between the inner circumferential surface 117b and the outer circumferential surface of the shaft 104 to prevent oil-leakage from the housing 106 due to capillary vessel behavior in the sealing gaps. At this time, if an oil-repellent agent is applied to at least an area of the outer circumferential surface of the shaft 104, which faces an inner circumferential surface 117b of the sealing member 117, oil-leakage can be effectively prevented. In order to prevent an increase of torque or torque fluctuations, the sealing member 117 may be preferably a non-contact seal.

The wave washer as the pressing member 118 is disposed between the bearing member 105 and the sealing member 117 so that open parts 119 are formed around periphery of the wave washer 118. In order to provide a sufficient area where the air bubbles are to be destroyed, a cross-sectional surface area of the open parts 119 is set to be larger than the cross-sectional surface area of the shaft 104 as viewed in section perpendicular to the rotational axis of the shaft 104. Preferably, the cross-sectional surface area of the open parts 119 is set to be more than twice the cross-sectional surface area of the shaft 104 to facilitate breakage of the air bubbles in the open parts 119 so that oil-leakage can be efficiently prevented.

That is to say, the following equation (2) is preferably satisfied, $$\pi D^2/4 \leq S2 \tag{2}$$

where S2 is the cross-sectional surface area of the open parts 119 as viewed in section, which is perpendicular to the axis of the shaft 104, D is a diameter of the shaft 104, and $\pi$ is a circular constant.

For example, in a case where the diameter of the shaft 104 is 2 mm, S2 is preferably set to more than 3.14 mm², more preferably, more than 6.28 mm².

While the bearing unit U is driven, the oil exuded from the bearing member 105 passes through the channel 115 and is pressed toward the opening of the housing 106 to be accumulated in the open parts 119. At this time, if the sealing member 117 is fixed in a close-contact state on the top end surface of the bearing member 105 as described in Japanese Patent Application Publication No. 2002-139041, open parts which are sufficiently adapted to release the air bubbles entrapped in the bearing unit when the bearing unit is assembled are not obtained. Thereby, particularly when the bearing unit is driven over about 40,000 to 50,000 rpm and therefore the motor unit is largely heated, the entrapped air bubbles are expanded and the oil is pressed up so that the oil leaks outside through the sealing member 117.

On the other hand, since the open parts 119 are formed between the bearing member 105 and the sealing member 117, the entrapped air bubbles are destroyed in the open parts 119 and only the air is exhausted through the gap between the shaft 104 and the sealing member 117 so that oil-leakage can be prevented.

Here, since the wave washer as the pressing member 118 is elastically deformed, the pressing force is maintained constant against expansion and contraction of the bearing member 105, the housing 106, or the like occurring due to thermal change.

As mentioned above, in the bearing unit according to the embodiment, the bearing member can be fixed on the housing without any adhesives, or the like. Therefore, there are advantageous effects in that the bearing unit is easily assembled and spaces sufficient to release the air entrapped in the bearing unit when the bearing unit is assembled are ensured so that the oil-leakage is effectively prevented to achieve reliability of the bearing unit.

Since the pressing member is elastically deformed and the pressing force is maintained constant in relation to expansion and contraction of the bearing member 105, the housing 106, or the like occurring due to thermal change, the bearing member is not moved to achieve high accuracy. In addition, since the structure of the pressing member is simple, cost for assembling can be reduced.

Third Embodiment

An optical scanner using an optical deflector 7 according to a third embodiment of the present invention will be explained with reference to FIGS. 10 to 12.

Figure 10:
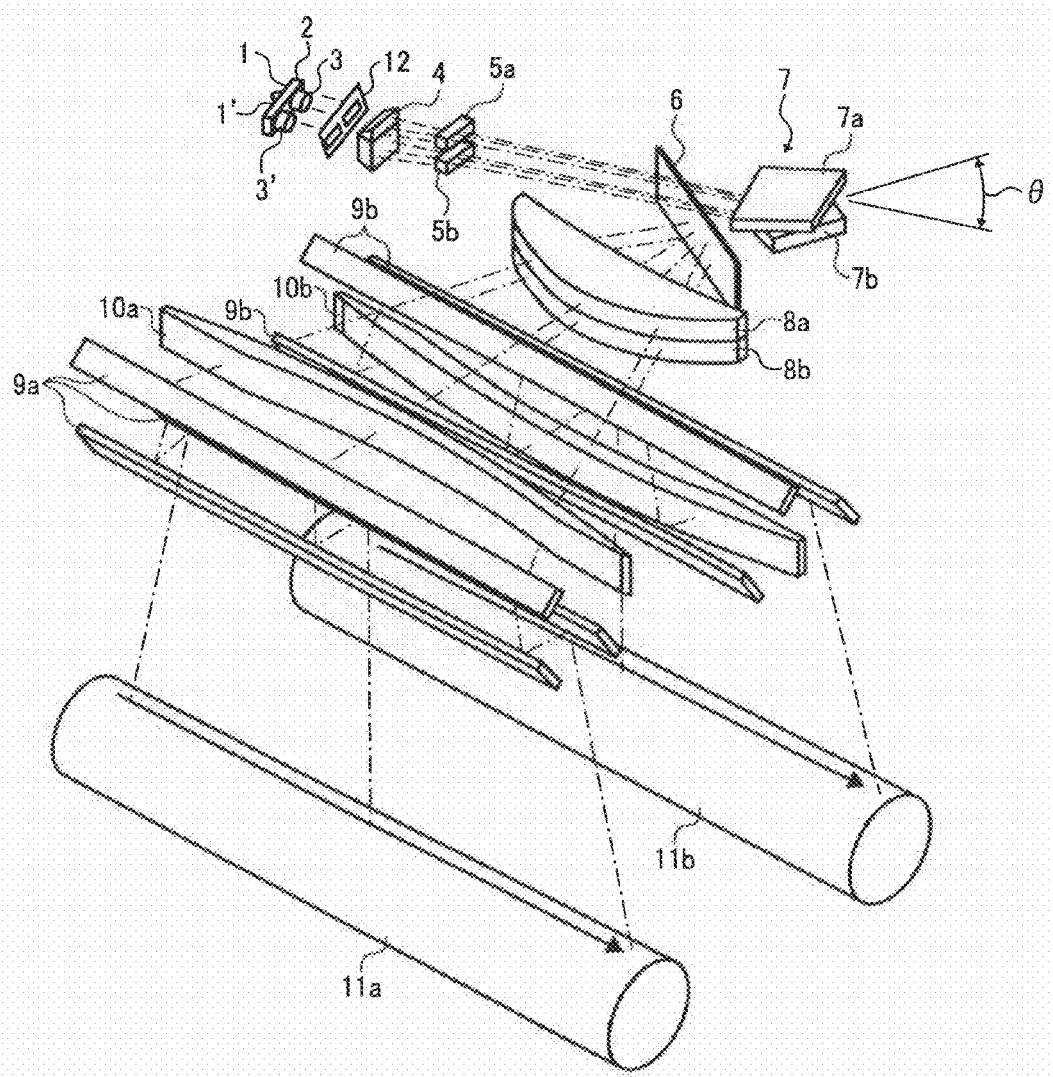
FIG. 10 is a view illustrating an optical scanner according to an embodiment of the present invention.

FIG. 10 shows a structure of the optical scanner according to the present embodiment. The optical scanner includes at least one semiconductor laser 1 (1') configured to emit a light beam to a surface to be scanned through an optical system including the optical deflector 7 to form a light spot on the surface. The light beam is deflected by the optical deflector to scan a scanning line of the surface to be scanned. The optical scanner may include a plurality of semiconductor lasers configured to emit a plurality of light beams to a surface to be scanned through an optical system including the optical deflector to form a plurality of light spots on the surface. The plurality of light beams are deflected by the optical deflector to scan adjacently a plurality of scanning lines of the surface. In the drawing the numeric codes 1, 1' represent semiconductor lasers which constitute a single light source and each emits one light beam. They are supported by a holder 2 to keep a predetermined positional relationship.

The light beams from the semiconductor lasers 1, 1' are converted by coupling lenses 3, 3' into light beams of a desired property (parallel light flux, light flux of weak divergence or of weak convergence) in accordance with the subsequent optical system. According to the present embodiment, the light beams are converted into parallel light fluxes by the coupling lenses 3, 3'.

Each light beam with a desired property emitted from the coupling lenses 3, 3' passes through an opening of an aperture 12 to adjust the widths of the light beams, and is then incident on a splitter prism 4. Each light beam is split into two by the action of the splitter prism 4 in the sub scan direction.

Figure 11:
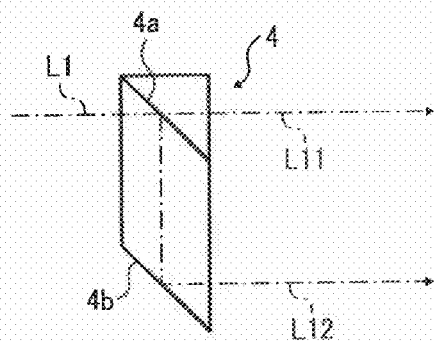
FIG. 11 is a view illustrating a configuration of a splitter prism.

FIG. 11 shows the light beam split into two. For the sake of simplicity, only the light beam L1 of the light beams emitted from the semiconductor laser 1 is illustrated. A vertical direction in FIG. 11 is a sub scan direction and the splitter prism 4 has a half mirror 4a and a reflection surface 4b in parallel in the sub scan direction. The light beam L1 is incident on the half mirror 4a. A part of the light beam L1 straightly transmits through the half mirror 4a to be a light beam L11, and the rest of the light beam L1 is reflected by the half mirror 4a and incident on the reflection surface 4b, and totally reflected thereby and becomes a light beam L12.

In this embodiment, the half mirror 4a and the reflection surface 4b are parallel to each other, and therefore the light beams L11, L12 emitted from the splitter prism 4 are parallel to each other. As described above, the light beam L1 is split into the two light beams L11, L12 in the sub scan direction. Similarly, the light beam from the semiconductor laser 1' is split into two.

Accordingly, two light beams are emitted from a single light source (m=1) and each of the two light beams is split into two (q=2) to obtain four light beams in total.

The four light beams are incident on cylindrical lenses 5a, 5b and gathered thereby in the sub scan direction to form a linear image that is long in a main scan direction near the deflection surface of polygon mirrors of the optical deflector 7.

As shown in FIG. 10, the light beams are emitted from the semiconductor lasers 1, 1' and split by the splitter prism 4, and a part thereof (light beam L11 in FIG. 11) straightly transmits through the half mirror 4a of the splitter prism 4 and is incident on the cylindrical lens 5a. A part (light beam L12 in FIG. 11) of the split light beams by the splitter prism 4 is reflected by the half mirror 4a and the reflection surface 4b, and incident on the cylindrical lens 5b.

A soundproof glass 6 is provided in a window of a soundproof housing of the optical deflector 7. The four light beams from the light source are incident on the optical deflector 7 via the soundproof glass 6 and deflected thereby and emitted to an optical scan and image formation system via the soundproof glass 6.

The optical deflector 7 as shown in FIG. 10 includes an upper polygon mirror 7a and a lower polygon mirror 7b which are superimposedly disposed in two stages and integrated with each other. The optical deflector 7 is rotated about a rotation axis by a not-shown driving motor.

According to this embodiment, the upper and lower polygon mirrors 7a, 7b each have the same shape and have four deflection surfaces. The deflection surfaces of the lower polygon mirror 7b are shifted from those of the upper polygon mirror 7a by a predetermined angle θ (45 degrees) in the rotation direction.

An optical scan and image formation system is constituted by a fθ lens 8a, a toroidal lens 10a, and a reflective mirror 9a, and configured to guide the two light beams (emitted from the semiconductor lasers 1, 1' and having passed through the half mirror 4a of the splitter prism 4) deflected by the upper polygon mirror 7a of the optical deflector 7 to a photoconductive drum 11a to be scanned, so that two optical spots are separately spaced in the sub scan direction.

Similarly, another optical scan and image formation system is constituted by a fθ lens 8b, a toroidal lens 10b, and a reflective mirror 9b, and configured to guide the two light beams (emitted from the semiconductor lasers 1, 1' and having passed through the half mirror 4a of the splitter prism 4) deflected by the upper polygon mirror 7a of the optical deflector 7 to a photoconductive drum 11b to be scanned, so that two optical spots are separately spaced in the sub scan direction.

The semiconductor lasers 1, 1' are arranged so that the light beams therefrom are crisscrossed with each other in the vicinity of a deflection surface seen from the rotation axis direction of the optical deflector 7. Accordingly, the two light beams incident on the deflection surfaces have a divergence angle (made by a projection of the two light beams on a plane perpendicular to the rotation axis).

With the divergence angle, the respective two light spots on the photoconductive drums 11a, 11b are separated from each other in the main scan direction. Thus, it is possible to individually detect the two light beams to scan the photoconductive drums 11a, 11b and to synchronize the light beams for each light beam at the start of scanning.

Accordingly, the photoconductive drum 11a is scanned with the two light beams deflected by the upper polygon mirror 7a of the optical deflector 7. Likewise, the photoconductive drum 11b is scanned with the two light beams deflected by the lower polygon mirror 7b of the optical deflector 7.

As described above, the deflection surfaces of the upper and lower polygon mirror 7a, 7b of the optical deflector 7 are shifted from each other by 45 degrees in the rotation direction. Because of this, when the photoconductive drum 11a is scanned with the light beams deflected by the upper polygon mirror 7a, the light beams deflected by the lower polygon mirror 7b are not guided to the photoconductive drum 11b. Similarly, when the photoconductive drum 11b is scanned with the light beams deflected by the lower polygon mirror 7b, the light beams deflected by the upper polygon mirror 7a are not guided to the photoconductive drum 11a.

In other words, the photoconductive drums 11a, 11b are scanned with the light beams by turns with a time lag. FIG. 12 shows the above alternative scanning. In the drawing, the light beams incident on the optical deflector 7 (actually, four beams) are shown as incident light, the deflected light beams are shown as deflected lights a, b.

Figure 12:
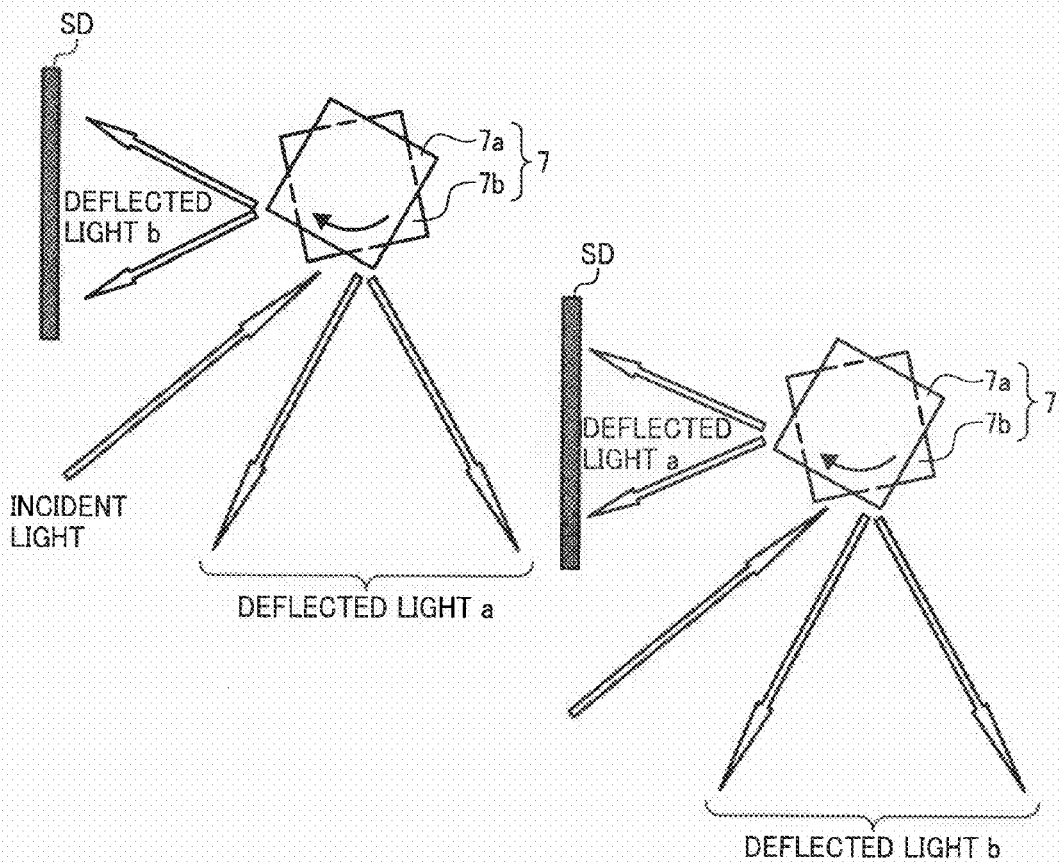
FIG. 12 is a view illustrating a directional relationship between two light beams deflected by the optical deflector

FIG. 12 at the left-hand side shows the incident light which is incident on the optical deflector 7, deflected by the upper polygon mirror 7a, and guided to the photoconductive drum 11a. The deflected light b deflected by the lower polygon mirror 7b is not directed to the photoconductive drum 11b. FIG. 12 at the right-hand side shows the incident light which is incident on the optical deflector 7, deflected by the lower polygon mirror 7b, and guided to the photoconductive drum 11b. The deflected light a deflected by the lower polygon mirror 7a is not directed to the photoconductive drum 11a.

Here, in order to prevent the deflected light by one of the polygon mirrors from acting as ghost light while the deflected light by the other of the polygon mirrors is guided to the photoconductive drum, it is preferable to employ a light shielding device SD as shown in FIG. 12 to shade the deflected light not to be guided to the photoconductive drum. Actually, this is very feasible by forming the internal walls of the above soundproof housing to be non-reflective.

As described above, according to the present embodiment, the photoconductive drums 11a, 11b are scanned with the light beams alternatively. Therefore, in scanning the photoconductive drum 11a, for example, light intensity of the light source is modulated with an image signal corresponding to a black color image, and in scanning the photoconductive drum 11b, the light intensity thereof is modulated with an image signal corresponding to a magenta color image. This enables formation of an electrostatic latent image of a black image on the photoconductive drum 11a, and formation of an electrostatic latent image of a magenta color image on the photoconductive drum 11b.

Figure 13:
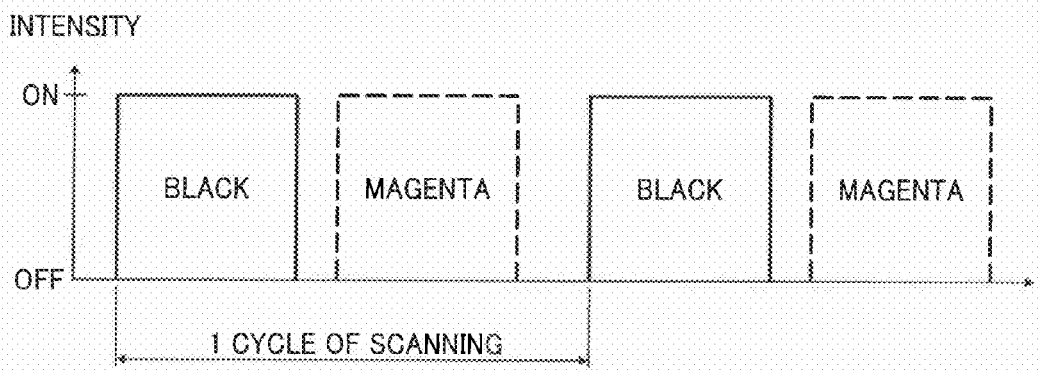
FIG. 13 is a view illustrating a scanning timing of light beams in an optical scanner.

FIG. 13 is a timing chart for writing, with a common light source (semiconductor lasers 1, 1'), a black color image on the entire scanning area of the photoconductive drum 11a and a magenta color image on the entire scanning area of the photoconductive drum 11b. The frames of solid lines represent a writing for the black color image and the frames of broken lines represent a writing for the magenta color image. Note that the timing at which an image is written is determined by detecting the light beam through an optical sensor (generally, a photodiode), as described above.

In the optical scanner, the optical deflector 7 having the bearing unit according to the first and second embodiments may be used. Accordingly, in the optical scanner, there are advantageous effects in that oil-leakage is prevented from occurring when the optical deflector is rotated at high speed, that is, over about 50,000 to 60,000 rpm so that accuracy of the bearing can be achieved. In addition, the number of parts or materials used in the light source unit can be reduced to reduce effects on the environment and failure probability.

Fourth Embodiment

Figure 14:
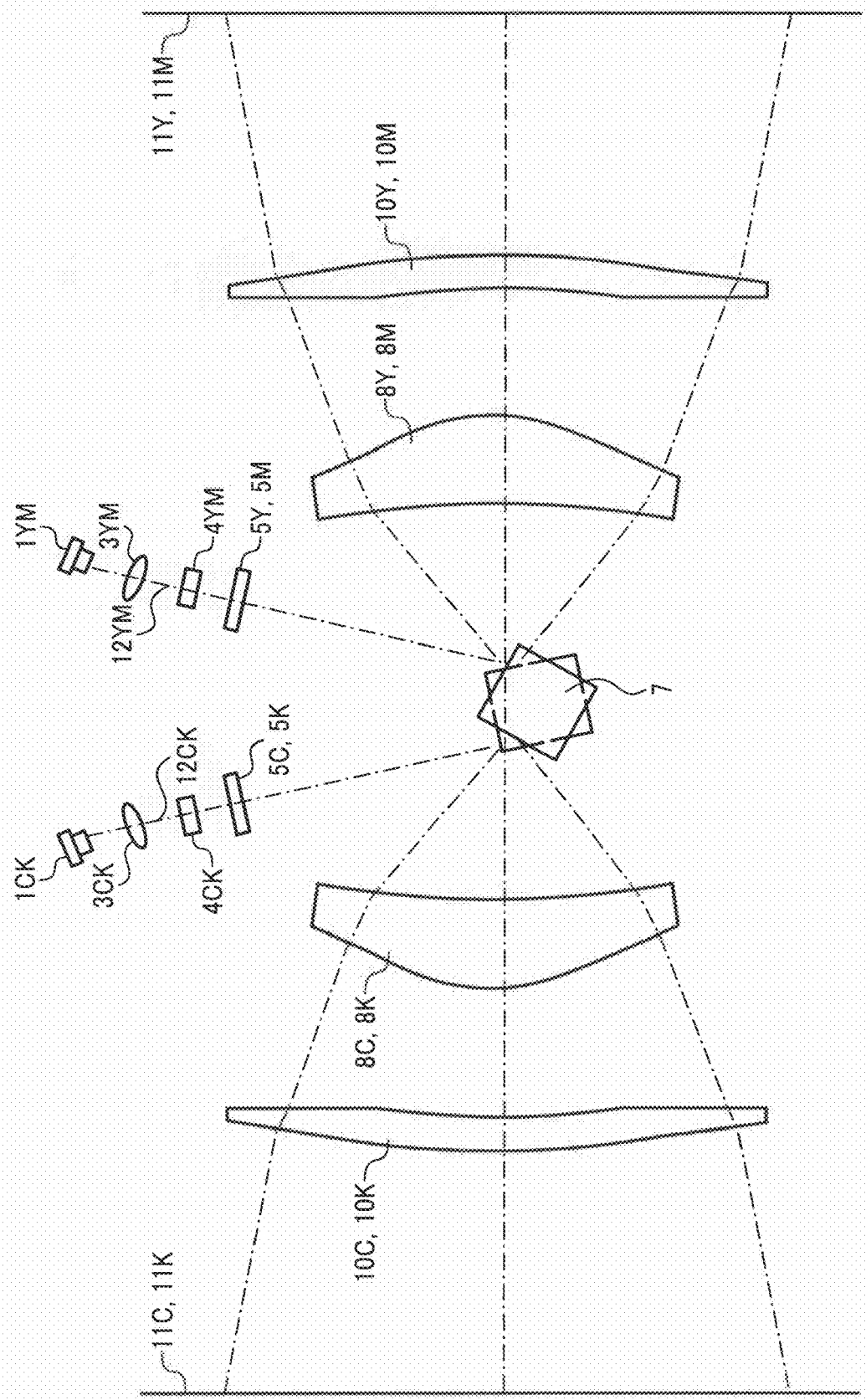
FIG. 14 is a view illustrating a configuration of an optical deflector used in an image forming apparatus according to an embodiment of the present invention.

Next, with reference to FIGS. 14 and 15, an image formation apparatus using the optical scanner according to a fourth embodiment will be described. FIG. 14 is a plain view of an optical system of the optical scanner viewed in a sub scan direction, that is, the rotation axis direction of the optical deflector 7. For the sake of simplicity, reflective plates which are disposed on optical paths from the optical deflector 7 to the surface to be scanned are omitted from the drawing and optical paths are represented by straight lines.

The optical scanner according to the present embodiment is configured to scan each of four areas to be scanned by a light beam in a case where m=q=2, p=1, n=4, where m is the number of light sources, q is the number of light beams, and n is the number of scanning objects. Electrostatic latent images formed on the four scanning objects corresponding to the four photoconductive drums 11Y, 11M, 11C, 11K are individually visualized with toners equivalent to yellow, magenta, cyan, black colors to thereby form color images.

Each of semiconductor lasers 1YM, 1CK emits a single light beam. The intensity of the semiconductor laser 1YM is modulated with an image signal corresponding to a yellow color image and an image signal corresponding to a magenta color image alternatively. The intensity of the semiconductor laser 1CK is modulated with an image signal corresponding to a cyan color image and an image signal corresponding to a black color image alternatively.

The light beams emitted from the semiconductor laser 1YM are made parallel by a coupling lens 3YM and pass through an aperture 12YM to be adjusted in width, and then, they are incident on a splitter prism 4YM to be split into two separate light beams in the sub scan direction. The splitter prism 4YM is the same as the splitter prism 4 in FIG. 10. One of the split beams is used for forming an electrostatic latent image corresponding to a yellow color image and the other is used for forming an electrostatic latent image corresponding to a magenta color image.

The split light beams in the sub scan direction are gathered in the sub scan direction by cylindrical lenses 5Y, 5M which are arranged to overlap with each other in the sub scan direction, and are incident on the optical deflector 7. The optical deflector 7 includes an upper polygon mirror and a lower polygon mirror each having four deflection surfaces, which are superimposedly disposed in two stages and integrated with each other with the two-staged deflection surfaces shifted from each other in the rotation direction. The cylindrical lenses 5Y, 5M form a linear image that is long in the main scan direction near the deflection surface of each polygon mirror.

The light beams deflected by the optical deflector 7 transmit through the fθ lenses 8Y, 8M and the toroidal lenses 10Y, 10M and form light spots on the photoconductive drum 11Y, 11M by the action of the above lenses. The photoconductive drums 11Y, 11M are scanned with the light spots.

Similarly, the light beams emitted from the semiconductor laser 1CK are made parallel by a coupling lens 3CK and pass through an aperture 12CK to be adjusted in width, and then, they are incident on a splitter prism 4CK to be split into two separate light beams in the sub scan direction. The splitter prism 4CK is the same as the splitter prism 4YM. One of the split beams is used for forming an image corresponding to a cyan color image and the other is used for forming an image corresponding to a black color image.

The split light beams in the sub scan direction are gathered in the sub scan direction by cylindrical lenses 5C, 5K which are arranged to overlap with each other in the sub scan direction, and are incident on the optical deflector 7. The light beams deflected by the optical deflector 7 transmit through the fθ lenses 8C, 8K and the toroidal lenses 10C, 10K and form light spots on the photoconductive drum 11C, 11K as scanning objects by the action of the above lenses. The photoconductive drums 11C, 11K are scanned with the light spots.

Figure 15:
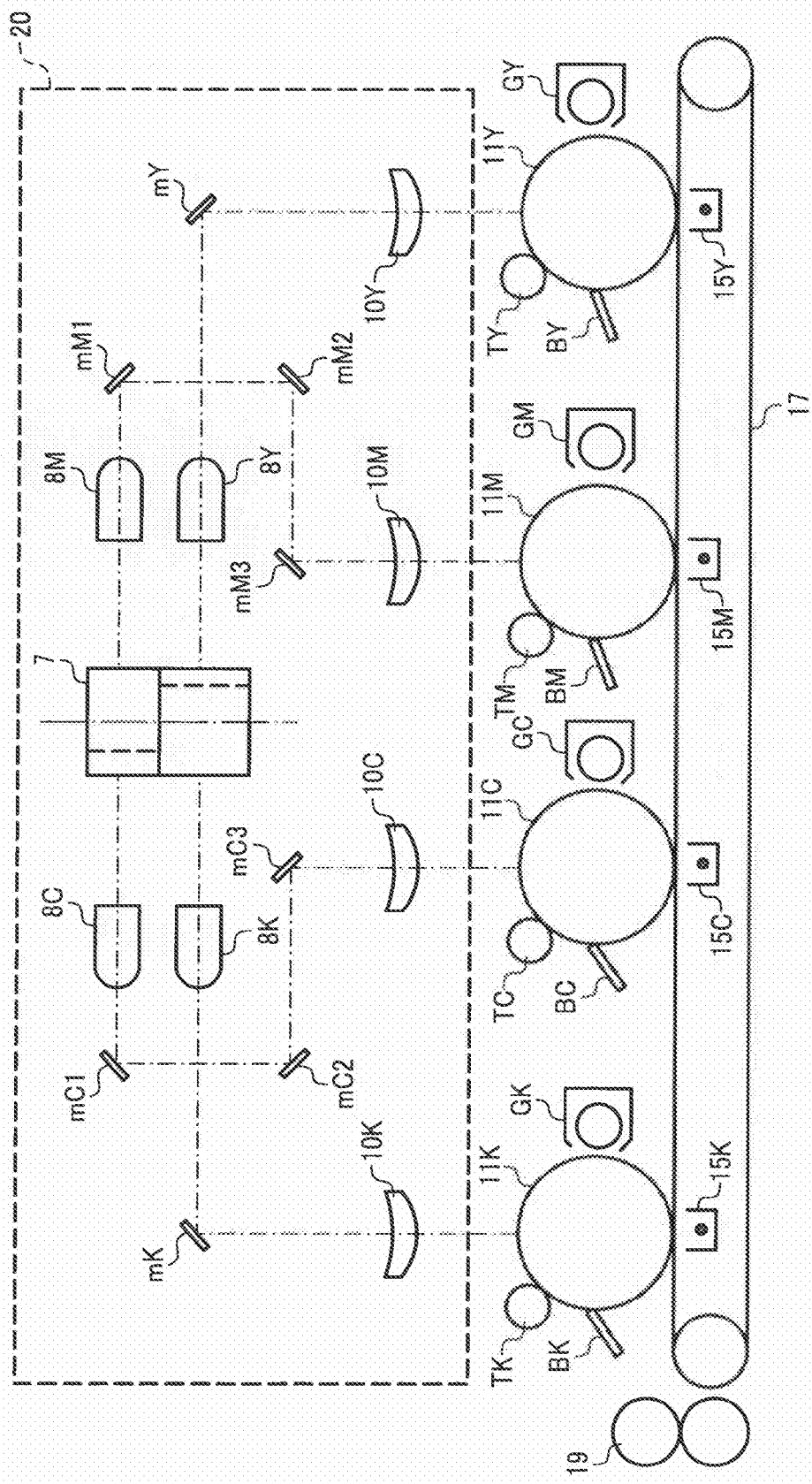
FIG. 15 is a view illustrating a configuration of an image forming apparatus according to an embodiment of the present invention.

As shown in FIG. 15, one of the light beams deflected by the upper polygon mirror of the optical deflector 7 is guided through an optical path flexed by reflective mirrors mM1, mM2, mM3 to the photoconductive drum 11M as a light-sensitive medium while the other of the light beams is guided through an optical path flexed by reflective mirrors mC1, mC2, mC3 to the photoconductive drum 11C as a light-sensitive medium.

Similarly, one of the light beams deflected by the lower polygon mirror of the optical deflector 7 is guided through an optical path flexed by a reflective mirror mY to the photoconductive drum 11Y while the other of the light beams is guided through an optical path flexed by a path flexing mirror mK to the photoconductive drum 11K.

Accordingly, the light beams from the two semiconductor lasers 1YM, 1CK (m=2) are split into two by the splitter prisms 4YM, 4CK, respectively, and the photoconductive drums 11Y, 11M, 11C, 11K are scanned with the four light beams. The photoconductive drums 11Y, 11M are scanned with the two split light beams from the semiconductor laser 1YM alternatively in accordance with the rotation of the optical deflector 7. The photoconductive drums 11C, 11K are scanned with the two split light beams from the semiconductor laser 1CK alternatively in accordance with the rotation of the optical deflector 7.

The photoconductive drums 11Y, 1M, 1C, 11K as positions to be scanned or scanning objects are rotated clockwise at a constant speed and uniformly charged by charge rollers TY, TM, TC, TK as electric chargers. The charged photoconductive drums 11Y, 11M, 11C, 11K are scanned with their respective light beams, to have yellow, magenta, cyan, black color images written thereon and respective electrostatic latent images (negative latent images) formed thereon.

The electrostatic latent images are inversely developed by developers GY, GM, GC, GK to form a yellow toner image, a magenta toner image, a cyan toner image, and a black toner image on the photoconductive drums 11Y, 11M, 11C, 11K, respectively.

The respective toner images are transferred on a not-shown transfer sheet. That is, the yellow toner image formed on the photoconductive drum 11Y is transferred by a transfer device 15Y onto the transfer sheet carried by a carrier belt 17. Similarly, the magenta toner image, cyan toner image, and black toner image on the photoconductive drums 11M, 11C, 11K are transferred by transfer devices 15M, 15C, 15K in sequence, respectively. Through the above process, the yellow toner image, magenta toner image, cyan toner image, and black toner image are superimposed on the transfer sheet to compositionally form a color image. The color image is fused on the transfer sheet by a fuser 19.

That is, the image formation apparatus according to the present embodiment is of a tandem type which individually forms electrostatic latent images on the plurality of photoconductive drums by optical scanning, visualizes the electrostatic latent images as toner images and transfers the toner images on the same transfer sheet, to thereby compositionally form images. It has the four photoconductive drums and the optical scanner with the two light sources 1YM, 1CK and is configured to scan the two photoconductive drums with the light beams from the respective light sources. With such a configuration, color images are formed by forming the electrostatic latent images corresponding to magenta, yellow, cyan, black colors on the four photoconductive drums 11Y, 11M, 11C, 11K and individually visualizing them with toners of magenta, yellow, cyan, black colors.

The optical deflector according to each of the first to third embodiments may be used as the optical deflector 7 in the optical scanner.

The image forming apparatus according to this embodiment has advantageous effects in that oil-leakage is prevented from occurring when the optical deflector is rotated at high speed, that is, over about 50,000 to 60,000 rpm so that accuracy of the bearing can be achieved. In addition, the number of parts or materials used in the light source unit can be reduced to reduce effects on the environment and failure probability.

Here, although the photoconductive drum is scanned in a single-beam system, the present invention is not limited thereto, that is, if the light source has the configurations shown in FIG. 10, the photoconductive drum can be scanned in a multi-beam system.

Although the present invention has been described in terms of exemplary embodiments, it is not limited thereto. It should be appreciated that variations may be made in the embodiments described by persons skilled in the art without departing from the scope of the present invention as defined by the following claims.

The bearing unit and the optical deflector, the optical scanner, and the image forming apparatus using the bearing unit according to the present invention can provide advantageous effects in that high rotational speed is achieved due to downsizing the bearing unit and reducing the diameter of the bearing unit, easy assembling is provided, oil-leakage is prevented, and high accuracy is achieved.

What is claimed is:

1. A hydrodynamic bearing unit using oil, comprising:
   a shaft to be driven;
   a bearing member configured to support the shaft in a non-contact manner through a bearing gap by a hydrodynamic pressure of the oil, which is generated in the bearing gap while the shaft relatively rotates with respect to the bearing member;
   a housing configured to house the bearing member, the housing including an opening at one end thereof, another end thereof being enclosed;
   a sealing member configured to seal at least a part of the opening of the housing;
   a channel configured to communicate a space provided between the shaft, the bearing member, and the housing with outside air; and
   a pressing member configured to press and fix the bearing member on the housing,
   wherein at least one open part configured to release an air bubble contained in the housing is provided between the bearing member and the sealing member.

2. The hydrodynamic bearing unit according to claim 1, wherein
   the pressing member has at least one contact portion which is in contact with an end surface of the bearing member in a circumferential direction from an inner circumferential surface of the bearing member; and
   the at least one open part includes at least one space provided adjacent to the at least one contact portion of the pressing member.

3. The hydrodynamic bearing unit according to claim 2, wherein the pressing member has a plurality of contact portions provided in circumferential directions from the inner circumferential surface of the bearing member.

4. The hydrodynamic bearing unit according to claim 1, wherein the sealing member is provided integrally in the pressing member.

5. The hydrodynamic bearing unit according to claim 1, wherein the sealing member is press-fitted in the housing.

6. The hydrodynamic bearing unit according to claim 1, wherein
   the pressing member is an elastic member and is fixed in a contact state with the bearing member and the sealing member by being pressed in an axial direction of the shaft; and
   the open part is a space provided on a periphery of the pressing member.

7. The hydrodynamic bearing unit according to claim 6, wherein the pressing member is a wave washer.

8. The hydrodynamic bearing unit according to claim 1,
   wherein the open part is a space provided between the bearing member and the sealing member in which the pressing member is not placed; and
   the following equation (1) is satisfied, $$\pi D^2/4 \leqq S \tag{1}$$

where S is a cross-sectional surface area of the space, which is perpendicular to an axis of the shaft, D is a diameter of the shaft, and π is a circular constant.

9. An optical deflector comprising the hydrodynamic bearing unit according to claim 1 and at least one polygon mirror, which is fixed on the shaft of the hydrodynamic bearing unit.

10. The optical deflector according to claim 9, wherein
    a plurality of polygon mirrors are disposed in a multi-stage manner in an axial direction of the shaft and are fixed such that a deflection surface of the one polygon mirror is shifted by a predetermined angle from that of the another polygon mirror in a rotational direction of the plurality of the polygon mirrors.

11. An optical scanner in which the optical deflector according to claim 9 is used, comprising
    a semiconductor laser configured to emit a light beam to a surface to be scanned through an optical system including the optical deflector to form a light spot on the surface to be scanned,
    wherein the light beam is deflected by the optical deflector to scan a scanning line of the surface to be scanned.

12. An optical scanner in which the optical deflector according to claim 9 is used, comprising
    a plurality of semiconductor lasers configured to emit a plurality of light beams to a surface to be scanned through an optical system including the optical deflector to form a plurality of light spots on the surface to be scanned,
    wherein the plurality of light beams are deflected by the optical deflector to scan adjacently a plurality of scanning lines of the surface to be scanned.

13. An image forming apparatus using the optical scanner according to claim 11, wherein
    the optical scanner scans a light-sensitive surface of a light-sensitive medium to form a latent image; and the latent image is visualized to form an image.

14. The optical deflector according to claim 10, wherein deflection surfaces of the one polygon mirror are unaligned with deflection surfaces of the another polygon mirror.

15. The hydrodynamic bearing unit according to claim 1, wherein the channel is provided in one or more surfaces of the bearing member.

16. The hydrodynamic bearing unit according to claim 2, wherein the at least one contact portion includes a plurality of contact portions provided between an end surface of the bearing member and a bearing-member-facing side of the sealing member, the plurality of contact portions being spaced apart from each other to create the at least one open part.

17. The hydrodynamic bearing unit according to claim 1, wherein the bearing member is an annular cylinder that includes the channel, the channel comprising:
    a chamfered outer circumferential edge and a chamfered inner circumferential edge of a first and second annular end surface of the annular cylinder;
    one or more first grooves provided on an outer cylindrical surface of the annular cylinder to connect the chamfered outer circumferential edge of the first annular end surface to the chamfered outer circumferential edge of the second annular end surface; and one or more second grooves provided on the first annular end surface and the second annular end surface, the one or more second grooves to connect the chamfered outer circumferential edge and the chamfered inner circumferential edge of the first annular end surface and the second annular end surface together, respectively.

* * * * *